F. POHLEY.
TRAPS FOR WATER PIPES AND CLOSETS.
No. 183,864. Patented Oct. 31, 1876.
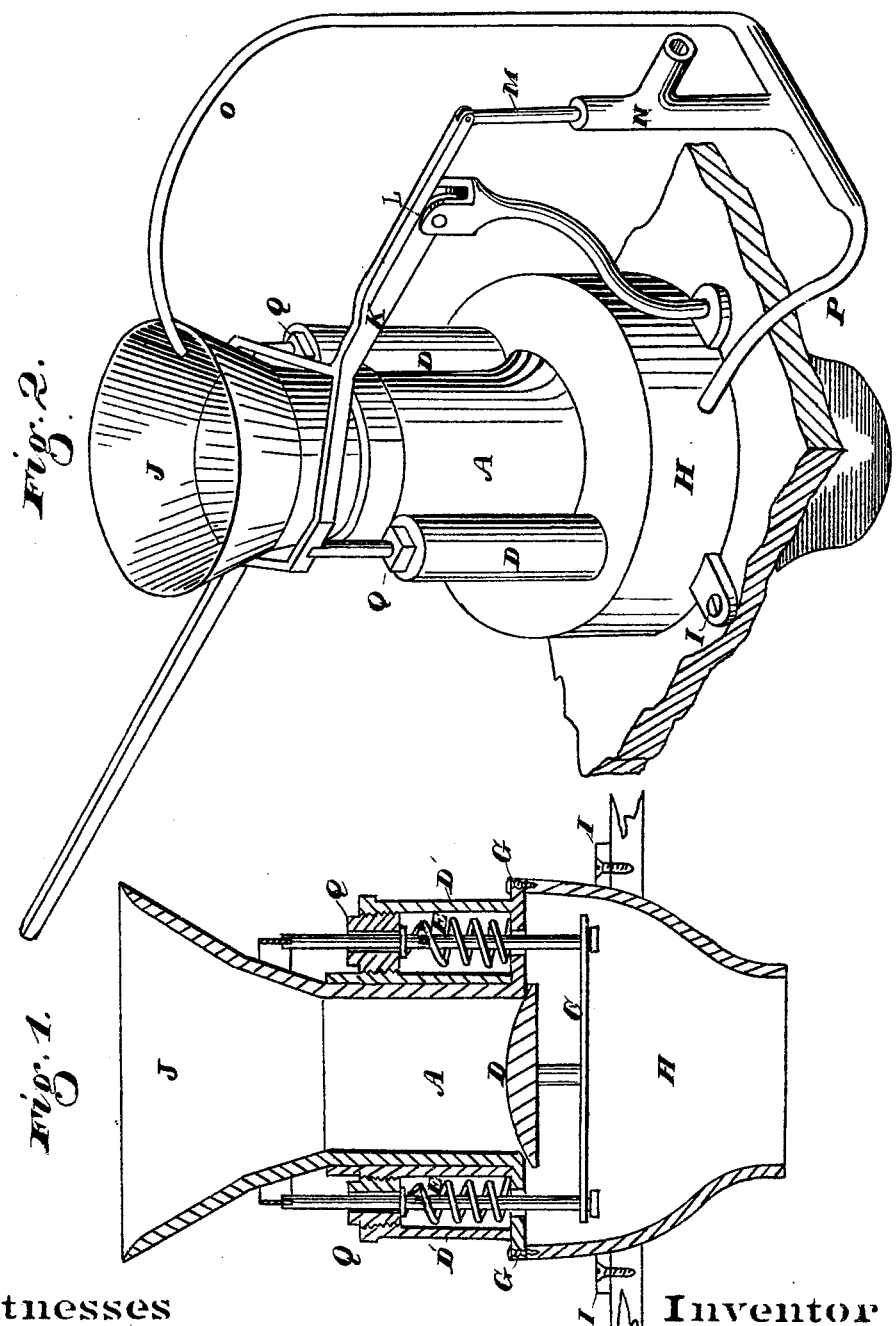
Witnesses
Geo. H. Strong
Jns. L. Borne
Inventor
Frederick Pohley
by Dewey & Co
Atty's

UNITED STATES PATENT OFFICE.

FREDERICK POHLEY, OF SAN FRANCISCO, CALIFORNIA.

IMPROVEMENT IN TRAPS FOR WATER PIPES AND CLOSETS.

Specification forming part of Letters Patent No. 183,864, dated October 31, 1876; application filed July 28, 1876.

*To all whom it may concern:*

Be it known that I, FREDERICK POHLEY, of the city and county of San Francisco, and State of California, have invented an Improved Trap for Water Pipes and Closets; and I do hereby declare the following to be a full, clear, and exact description thereof, reference being had to the accompanying drawing.

My invention relates to an improved trap for water-pipes; and it is more especially useful for making connections with sewers, water-closets, &c. It consists in the employment of a pipe having an exit-valve at its lower end. This valve is connected with springs, which operate to close it after a certain amount of water has run out, and the remainder is retained, and acts as a trap to prevent the return of foul odors.

The trap may be operated automatically by the weight of water in the pipe, or by hand, foot, or other power, as in water-closets, and may be so connected in the latter case as to open a valve, and allow water to enter and wash out the basin.

Referring to the accompanying drawings, for a more complete explanation of my invention, Figure 1 is a sectional elevation, and Fig. 2 is a perspective view, of my invention.

A is a section of the discharge-pipe, and D is a valve which fits closely against its lower end. This valve is secured to a bar, C, the ends of which extend upon each side beyond the pipe; but in practice it may be found preferable to make this bar a continuation of the spring-stems, bending it so as to attach to the bottom of the valve.

Upon each side of the pipe are two short cases, D', within which are placed spiral or other springs E. A stem, F, rises from the transverse bar C, (or it may form a part of it, as before described,) passing through each spring, and having a head, so that any desired pressure upon the valve D will compress the springs E.

In the present case I have shown my valve as used in connection with a water-closet, and the pipe A is made with a flange, G, at the bottom. This flange bolts down upon the top of the cup H, which is firmly secured to the floor at I, and thus the entire device may be easily removed at any time for repairs.

Above the pipe A the bowl J is placed, as shown. The valve B is made, preferably, with a convex upper surface, and its edge where it meets the joint-face of the pipe A may be made of soft metal, which will insure a tight joint, without using any soft packing, which will easily wear out.

When my trap is to be used in sinks or ordinary water-pipes, the tension of the springs E will be such that a small quantity of water will always be retained upon the valve; but when the weight of the water increases beyond a certain amount, the valve will be opened for its escape until the original level is again attained, when the valve will close, and the remaining water will serve as a trap.

In water-closets the tension of the springs will be greater, and it will be necessary to extend the stems F up through the tops of the cases D, so that they can be operated upon by the arms of the lever K, which is pivoted at one side of the bowl at L, as shown. The opposite end of the lever may be connected with a knob, which can be operated by hand or the foot, or it may be attached to the seat, so that the weight of the person will operate it.

The lever K extends a short distance beyond the fulcrum L, and this extension is attached to the stem M of a valve in the pipe N. Two branches, O and P, lead from the pipe N—one to a point just above the valve B, and the other opens into the bowl, so that when the lever K is forced down, and the valve B is opened, water will be allowed to flow through these pipes and wash out the bowl, cleansing the valve at the same time.

In order to adjust the tension of the springs E, I make two screw-caps, Q, for the cases D and the stems F, which may be screwed down, more or less, to increase or diminish the tension of the springs.

Having thus described my invention, what I claim as new, and desire to secure by Letters Patent, is—

1. The convex valve D, with its face fitting the end of the pipe A, in combination with the stem F, and the springs E, working in the inclosive cases D', for the purpose of making a trap, substantially as herein described.

2. The valve D, fitting the end of the pipe

A, the stems F, and operating-springs E, together with the screw-caps Q, for adjusting the tension of the springs, substantially as herein described.

3. The device consisting of the valve D, stems F, and tension-springs E, in combination with the lever K, having an extension, so as to operate the valve in the pipe N, and admit water to the pipes O and P, substantially as herein described.

4. In combination with the pipe A, with its valve D, stems F, and springs E, the flange G, supporting the cases D, and secured to the cup H, substantially as herein described.

FREDERICK POHLEY. [L. S.]

Witnesses:
GEO. H. STRONG,
OLWYN T. STACY.